(12) United States Patent
Rooke

(10) Patent No.: US 8,333,368 B2
(45) Date of Patent: Dec. 18, 2012

(54) HYDRAULICALLY DAMPED MOUNTING DEVICE

(75) Inventor: Michael Paul Rooke, Wiltshire (GB)

(73) Assignee: DTR VMS Limited, Wiltshire (GB)

( * ) Notice: Subject to any disclaimer, the term of this patent is extended or adjusted under 35 U.S.C. 154(b) by 303 days.

(21) Appl. No.: 12/868,313

(22) Filed: Aug. 25, 2010

(65) Prior Publication Data
US 2011/0291335 A1 Dec. 1, 2011

(30) Foreign Application Priority Data
May 28, 2010 (GB) .................................. 1009072.8

(51) Int. Cl.
*F16F 13/10* (2006.01)
(52) U.S. Cl. ......... 267/140.13; 267/140.11; 267/140.12; 267/140.14; 267/140.15; 267/219; 188/282.6
(58) Field of Classification Search ............. 267/140.13, 267/140.14, 140.12, 140.11, 140.15
See application file for complete search history.

(56) References Cited

U.S. PATENT DOCUMENTS

| | | | |
|---|---|---|---|
| 5,180,148 A * | 1/1993 | Muramatsu | 267/140.14 |
| 5,314,173 A | 5/1994 | Ide et al. | |
| 5,642,873 A * | 7/1997 | Kato | 267/140.14 |
| 5,769,402 A * | 6/1998 | Ide et al. | 267/140.14 |
| 5,848,782 A * | 12/1998 | Hein et al. | 267/140.11 |
| 6,017,024 A | 1/2000 | Muramatsu et al. | |
| 6,585,242 B2 * | 7/2003 | Kodama et al. | 267/140.13 |
| 8,006,965 B2 * | 8/2011 | Kojima | 267/140.13 |
| 8,104,750 B2 * | 1/2012 | Hasegawa et al. | 267/140.14 |
| 2003/0011117 A1 * | 1/2003 | Nishi et al. | 267/140.14 |

FOREIGN PATENT DOCUMENTS

| | | |
|---|---|---|
| EP | 0115417 A2 | 1/1984 |
| EP | 0172700 A1 | 8/1985 |
| GB | 2282430 A | 4/1995 |
| JP | 2001090772 A | 4/2001 |

* cited by examiner

*Primary Examiner* — Robert F Siconolfi
*Assistant Examiner* — San Aung
(74) *Attorney, Agent, or Firm* — McGarry Bair PC

(57) ABSTRACT

A hydraulically damped mounting device has first and second anchor parts connected by a first deformable wall, and a working chamber for hydraulic fluid partially bounded by the first deformable wall. The working chamber is connected to a composition chamber for the hydraulic fluid by a first passageway, the composition chamber being partially bounded by a second deformable wall. There is also an auxiliary chamber partially bounded by a third deformable wall connected to the working chamber by a second passageway. The mounting device then has a vacuum chamber connectable to a vacuum source for varying the pressure in the vacuum chamber.

13 Claims, 9 Drawing Sheets

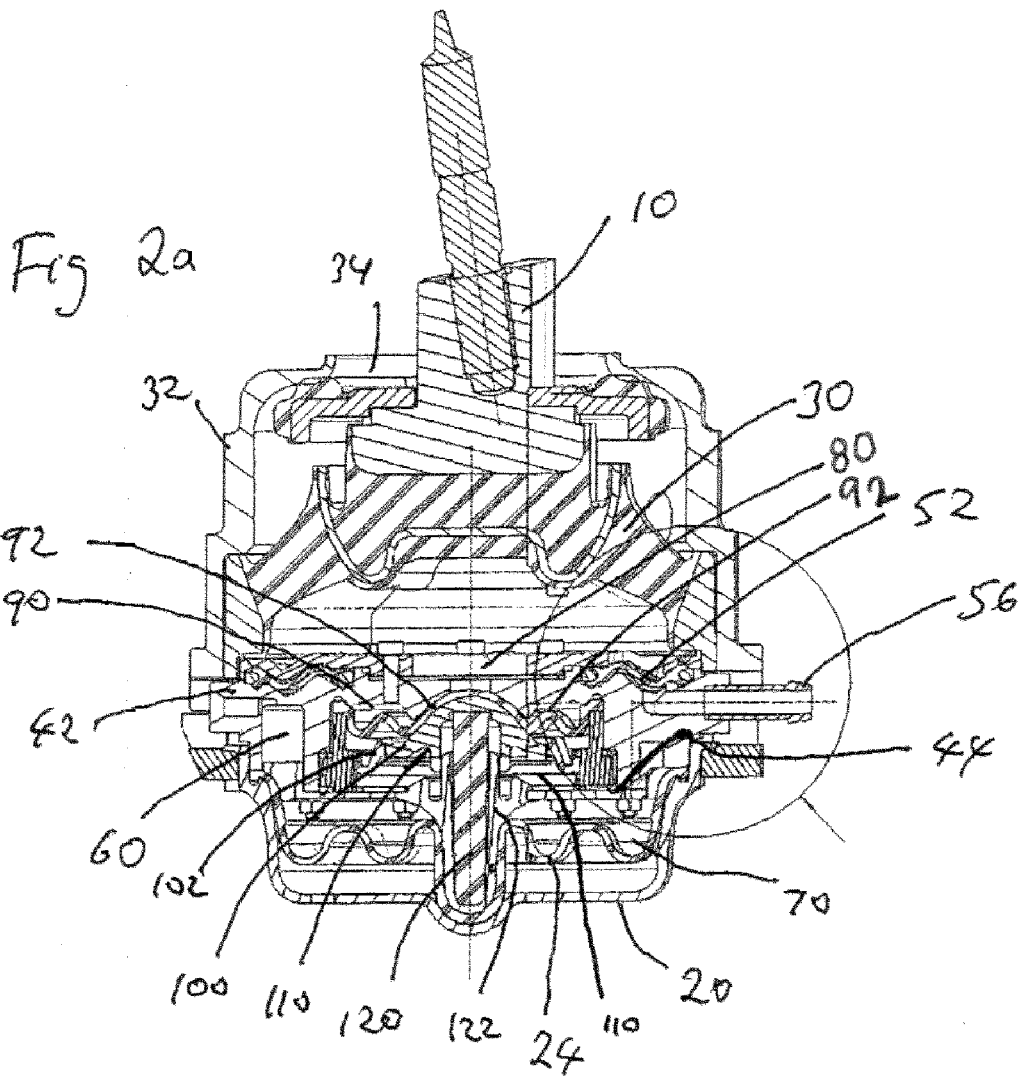
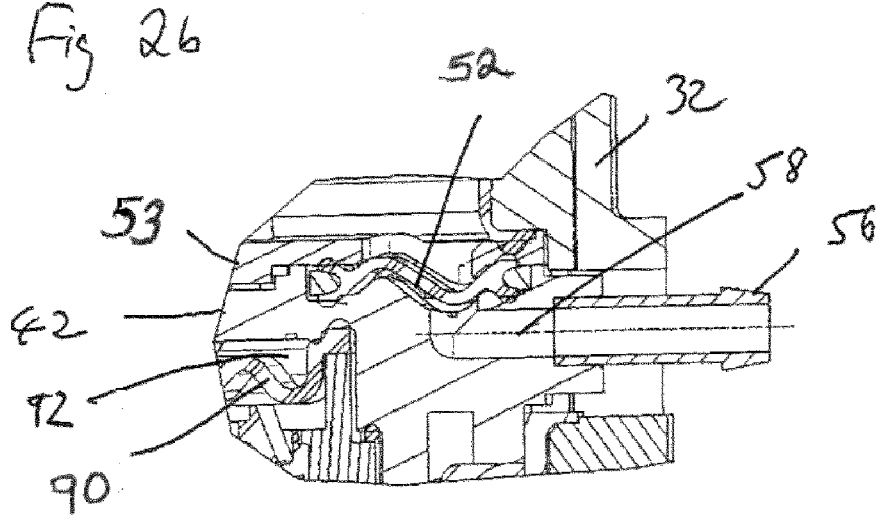

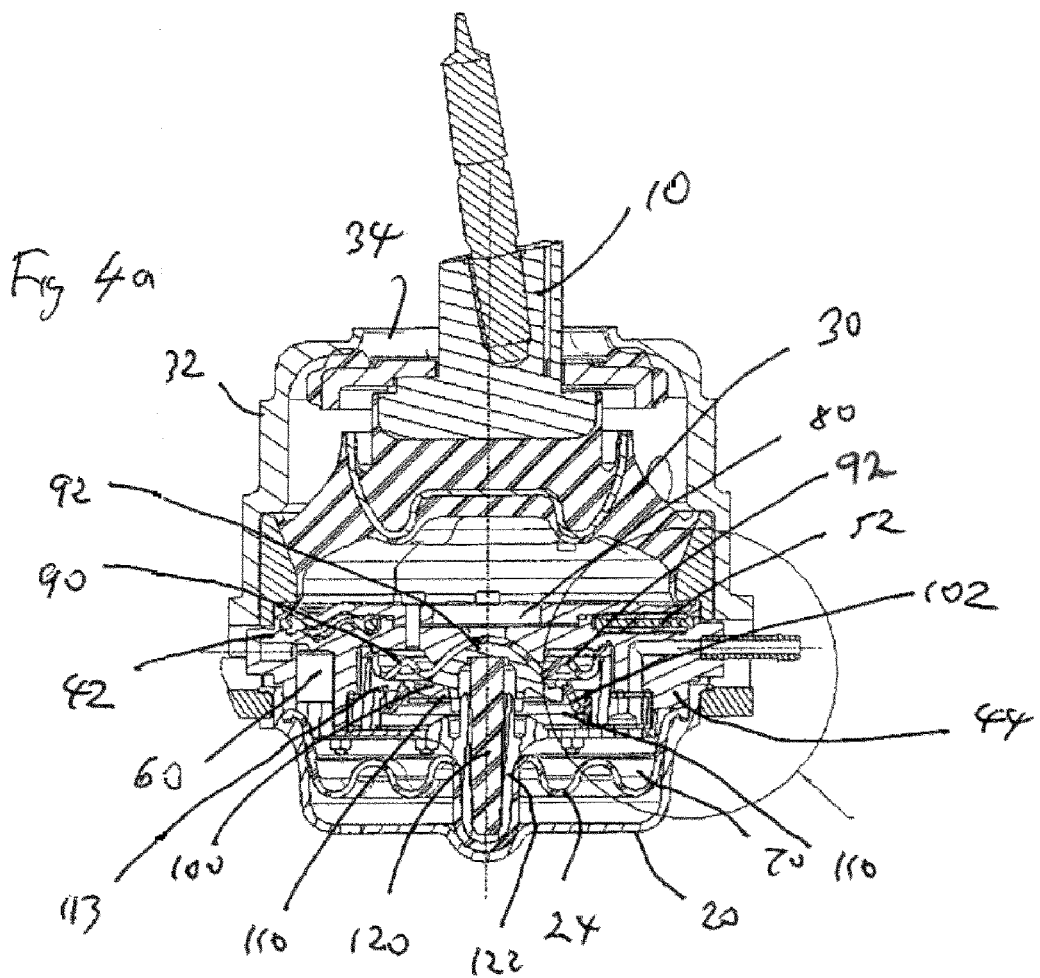

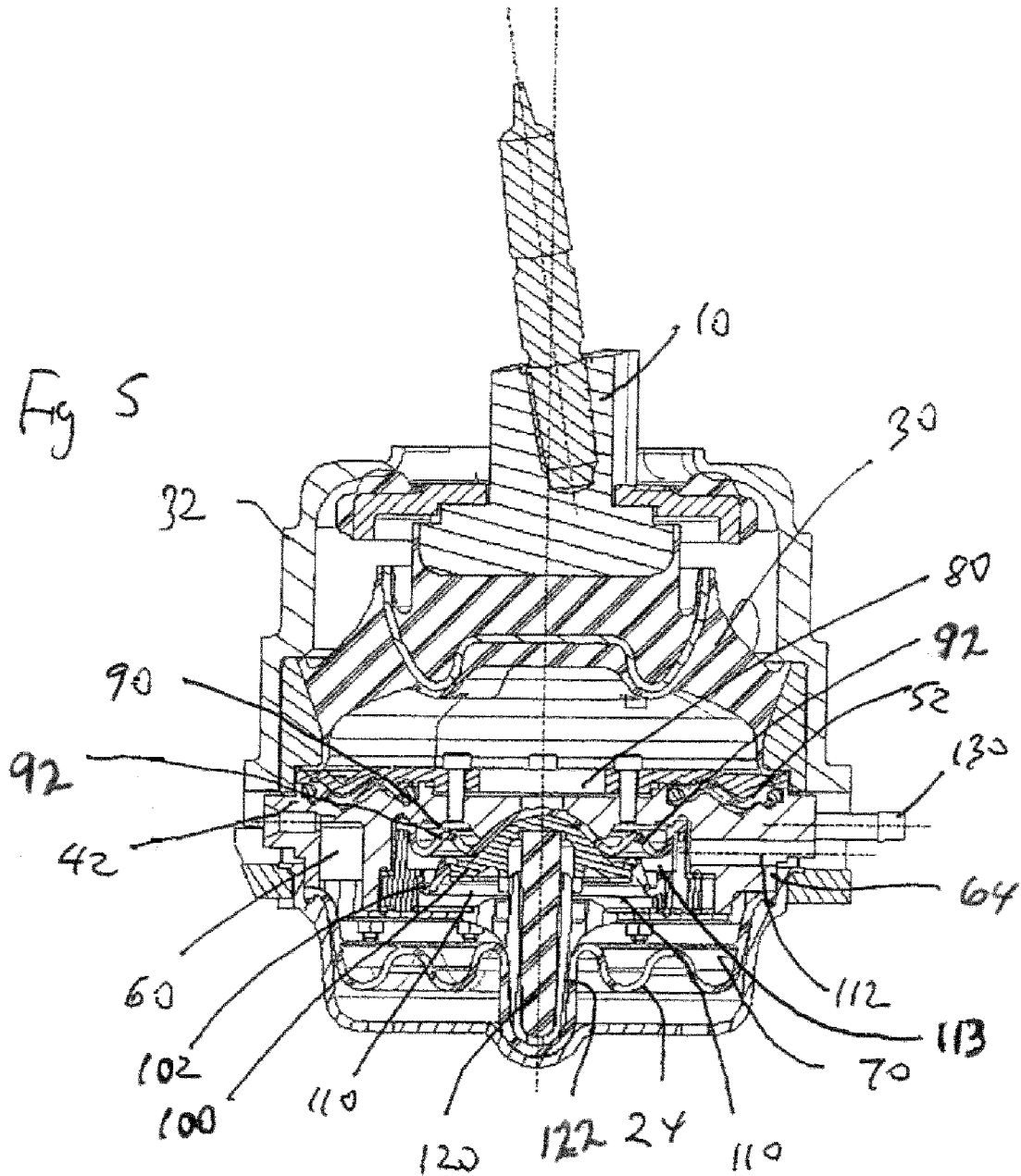

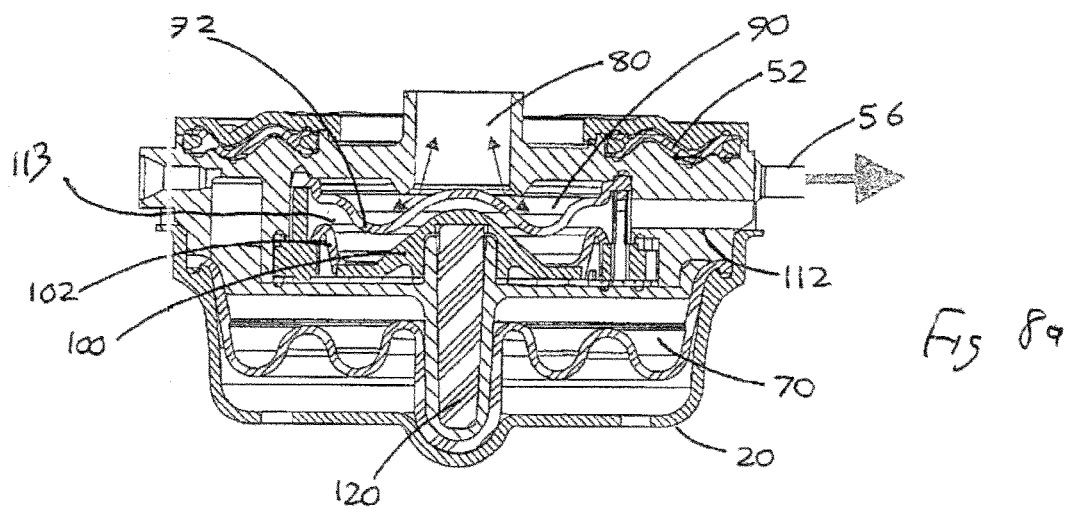
Fig 8a
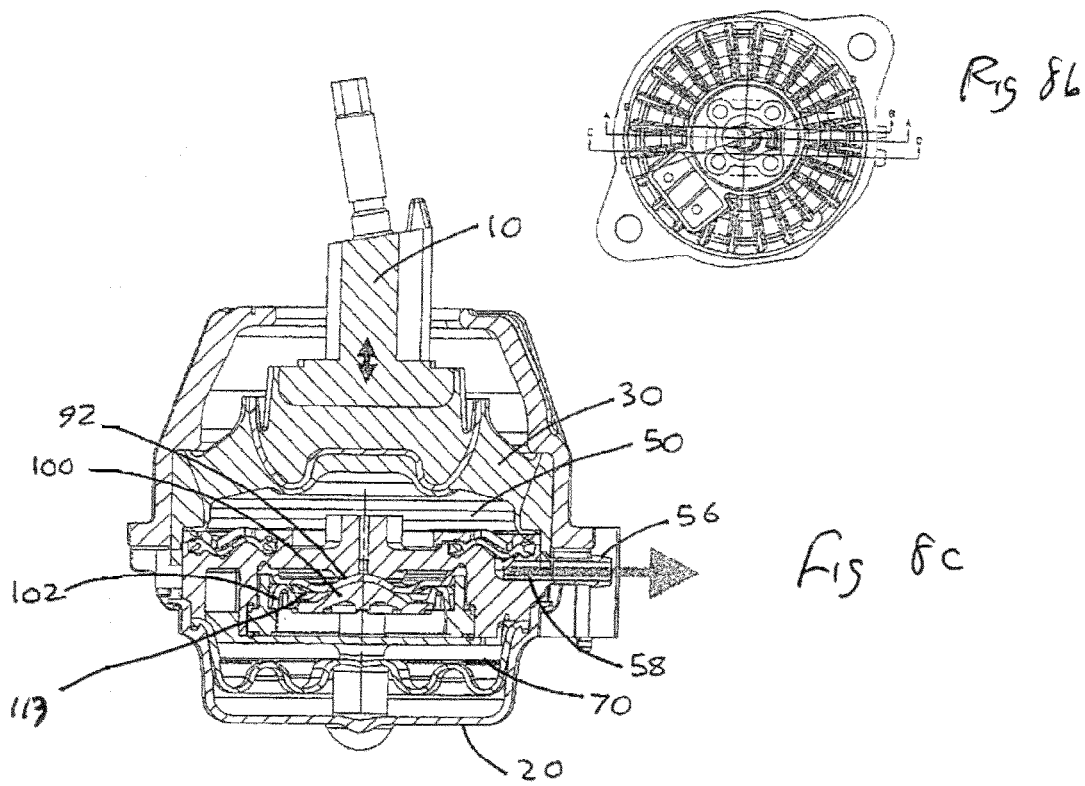
Fig 8b
Fig 8c

HYDRAULICALLY DAMPED MOUNTING DEVICE

CROSS-REFERENCE TO RELATED APPLICATION(S)

This application claims the benefit of British Patent Application No. GB1009072.8, filed May 28, 2010, which is incorporated herein by reference in its entirety.

BACKGROUND OF THE INVENTION

1. Field of the Invention

The present invention relates to a hydraulically damped mounting device. Such a device usually has a pair of chambers for hydraulic fluid, connected by a suitable passageway, and damping is achieved due to the flow of fluid through that passageway.

2. Summary of the Prior Art

EP-A-0115417 and EP-A-0172700 discuss two different types of hydraulically damped mounting devices for damping vibration between two parts of a piece of machinery, e.g. a car engine and a chassis. EP-A-0115417 disclosed various "cup and boss" type of mounting devices, in which a "boss", forming one anchor part to which one of the pieces of machinery is connected, is itself connected via a deformable (normally resilient) wall to the mouth of a "cup", which is attached to the other piece of machinery and forms another anchor part. The cup and the resilient wall then define a working chamber for hydraulic fluid, which is connected to a compensation chamber by a passageway (usually elongate) which provided the damping orifice. The compensation chamber is separated from the working chamber by a rigid partition, and a flexible diaphragm is in direct contact with the hydraulic fluid and, together with the partition, forms a gas pocket.

In EP-A-0172700 the mounting devices disclosed are of the "bush" type. In this type of mounting device, the anchor part for one part of the vibrating machinery is in the form of a hollow sleeve with the outer anchor part in the form of a rod or tube extending approximately centrally and coaxially of the sleeve. In EP-A-0172700 the tubular anchor part is connected to the sleeve by resilient walls, which define one of the chambers in the sleeve. The chamber is connected via a passageway to a second chamber bounded at least in part by a bellows wall which is effectively freely deformable so that it can compensate for fluid movement through the passageway without itself resisting that fluid movement.

In the hydraulically damped mounting devices disclosed in the specifications discussed above, there is a single passageway. It is also known, from other hydraulically damped mounting devices, to provide a plurality of independent passageways linking the chambers for hydraulic fluid.

In EP-A-0115417, there is a single diaphragm, which is configured to give a specific influence on the vibration characteristics of the hydraulically damped mounting device. Those characteristics depend on the stiffness of the diaphragm, by which is meant the change in applied pressure needed to cause unit change in the volume displaced by the diaphragm. Furthermore, the surface of the diaphragm which is in contact with the fluid in the working chamber may be covered by a snubber plate, with openings therein for fluid communication therethrough between the upper surface of the diaphragm and the rest of the working chamber, and it has been found that the size of those openings also affects the characteristics of the mount.

In GB-A-2282430, a mounting device is disclosed of the "cup and boss" type, with two diaphragms. The two diaphragms are arranged to have different characteristics, such as different stiffnesses or different effective stiffnesses, due to the shape of the openings by which fluid reaches those diaphragm parts from the working chamber. GB-A-2282430 also discloses that either or both of the diaphragms may be convoluted.

It is also known to provide an additional passageway to link the working chamber with another hydraulic chamber, separate from the compensation chamber, the additional passageway having a lower fluid resistance than the passageway between the working and compensation chambers.

In U.S. Pat. No. 5,180,148, a passage is formed between a pressure receiving chamber and a second equilibrium chamber. The passage is normally closed, and is held closed by the action of an elastic dish member which bears against a diaphragm via a thin rigid disk. The passage can be opened by application of a vacuum on the side of the elastic dish member not bearing against the diaphragm, so that the elastic dish member is separated from the diaphragm.

In U.S. Pat. No. 6,017,024, a passage is formed between a primary fluid chamber and an auxiliary fluid chamber. The passage is normally held closed by the action of a tensile spring, which bears against a circular metal disk. The metal disk is movable relative to the passage by flexing of a surrounding annular rubber member. This movement is controlled by control of the pressure in a vacuum chamber underneath the metal disk.

SUMMARY OF THE INVENTION

An advantage of such arrangements is that fluid oscillations induced by vibration at low amplitudes and/or high frequencies can be effectively damped. However, the present inventors have established that a problem with known arrangements is that the cyclic flexing of the elastic/rubber member, especially at high temperatures, causes gradual degradation of the rubber. This can have the effect of causing the elastic/rubber member to suffer permanent rubber set, i.e. to lose its resilience and become permanently misshapen, so that it can no longer perform its intended function in maintaining closure of the passageway in the absence of a low pressure, or vacuum, in the vacuum chamber.

At its most general, the present invention proposes that a passageway for transferring hydraulic fluid between a working chamber and an auxiliary chamber in a hydraulically damped mounting device is opened by varying the pressure in a vacuum chamber to move an abutment part connected to the vacuum chamber by a rolling diaphragm from a position in which the abutment part closes the passageway to a position in which the passageway is open.

Thus, in a first aspect the present invention provides a hydraulically damped mounting device comprising:

first and second anchor parts connected by a first deformable wall;

a working chamber partially bounded by the first deformable wall, the working chamber containing hydraulic fluid;

a compensation chamber for the hydraulic fluid, the compensation chamber being partially bounded by a second deformable wall;

a first passageway interconnecting the working and compensation chambers to allow movement of the hydraulic fluid between the working and compensation chambers;

an auxiliary chamber for hydraulic fluid, the auxiliary chamber being partially bounded by a third deformable wall;

a second passageway interconnecting the working chamber and the auxiliary chamber;

a vacuum chamber connectable to a vacuum source for varying the pressure in the vacuum chamber, the vacuum chamber being partially bounded by an abutment part movably mounted therein, the abutment part being movable in response to a change in pressure in the vacuum chamber between a first position in which the abutment part bears against the third deformable wall such that the third deformable wall is deformed to close the second passageway and a second position in which the abutment part allows the third deformable wall to adopt a position in which the second passageway is open; and a resilient biasing member arranged to bias the abutment part towards the first position, wherein the abutment part is connected to a wall of the vacuum chamber by a rolling diaphragm to permit movement of the abutment part relative to the wall of the vacuum chamber.

The rolling diaphragm acts to provide a seal for the vacuum chamber in any position of the abutment part. The rolling diaphragm may be connected at a first edge thereof to the wall of the vacuum chamber and at a second edge thereof may then be connected to the abutment part. A U-shaped convolution, or loop, is formed between the first and second edges. Movement of the abutment part relative to the wall of the vacuum chamber causes movement of the second edge relative to the first edge. This relative movement causes the rolling diaphragm to "roll", i.e. to move so that the convolution travels along the diaphragm in the direction running from the second edge to the first edge. Thus, the abutment part can move relative to the wall of the vacuum chamber without stretching the rolling diaphragm, i.e. without inducing significant tensile strain.

It should be noted that the abutment part may be made of the same material as the rolling diaphragm, and indeed may be integral with the rolling diaphragm. It is also possible for the abutment part to be of the same material, and partially integral with the resilient biasing member. There may be manufacturing advantages in having the abutment part, rolling diaphragm and resilient biasing member produced by a single molding. However, it is currently preferred to form the resilient biasing member as a rigid element which is produced separately from the rolling diaphragm and the resilient biasing member As discussed above, the present inventors have found that the flexible elastic/rubber passage closure members of conventional mounting devices suffer from permanent rubber set as a result of repeated cycling, especially at high temperatures. The first aspect of the present invention does not suffer from this disadvantage because the abutment part and rolling diaphragm need not undertake any spring-like functions or be subjected to significant tensile or compressive strains. Instead, all the spring-like functions can be undertaken by the separate resilient biasing member and the displacement of the abutment part is accommodated by 'rolling' of the rolling diaphragm.

Normally, in the first position the third deformable wall is deformed so that it extends across the second passageway at its entrance, i.e. opening or mouth, to the auxiliary chamber, to thereby close the second passageway. In that position it would normally abut a fixed part of the mount at or adjacent the entrance to the second passageway. In the second position the third deformable wall is normally clear of the entrance of the second passageway to the auxiliary chamber, so that the second passageway is open. In that position, the third deformable wall can move in the auxiliary chamber to allow some fluid movement between the working and auxiliary chambers through the second passageway.

Optional further features of the present invention will now be described. These features can, where appropriate, be combined with the features of the first aspect, or the features of the second aspect described below, either alone or in combination.

The resilient biasing member may be a columnar block of resilient material, one end of which is fixed relative to the first anchor part and the other end of which is in contact with the abutment part, whereby the resilient biasing member is held under a compressive force. In this way, the operating characteristics of the mounting device may be controlled by controlling the configuration of the columnar block of resilient material, including its geometry and/or material properties. By way of clarification and not of limitation, the terms 'columnular' and 'columnar' may be used interchangeably to refer to a column-like object.

The resilient biasing member may be held within a collar arranged to restrict radial movement of the column of resilient material. In this way, buckling of the columnar block of resilient material can be avoided. The collar may extend along the majority of the length of the columnar block of resilient material. The configuration, e.g. geometry, of the collar may be selected to achieve a threshold compressive strain within the resilient material and/or to achieve a desired compressive force. Preferably, there is a first clearance, i.e. ring-shaped gap, between the columnar block of resilient material and the collar when the abutment part is in the first position. When the abutment part is in the second position the columnar block of resilient material and the collar may abut one another, i.e. so that there is no clearance between them, or there may be a second clearance smaller than the first clearance between the collar and the columnar block of resilient material.

The resilient material may be rubber, or any other material with suitable elastic properties.

The rolling diaphragm may have an annular shape with an inner circumference and an outer circumference, the inner circumference being fixed to the abutment part and the outer circumference being fixed to said wall of the vacuum chamber. Thus, the rolling diaphragm may encircle the abutment part. In such a configuration the convolution of the rolling diaphragm is ring-shaped, so that it forms a ring between the inner and outer circumferences.

The mounting device may have a first gas pocket at least partially bounded by the third deformable wall, the abutment part and the rolling diaphragm. The volume of the first gas pocket changes in response to the position of the abutment part and the consequent position of the third deformable wall: the volume is at a minimum when the abutment part is in the first position, and increases when the abutment part moves to the second position. The first gas pocket may be a closed volume, i.e. sealed from the atmosphere, but is preferably open to the atmosphere.

The abutment part may have a dome-shaped portion arranged to protrude into the second passageway in the first position. This arrangement provides a good seal between a rim of the second passageway and the third deformable wall in the first position of the abutment member.

The mounting device may have a second gas pocket at least partially bounded by a fourth deformable wall separating the second gas pocket from the working chamber. Movement, e.g. vibration, of the fourth deformable wall can thus accommodate changes in the volume of the working chamber caused by relative movement of the first and second anchor parts. In this way, the fourth deformable wall and second gas pocket can serve to aid damping of vibrations, especially medium to high amplitude vibrations. The fourth deformable wall may have an annular shape. The second gas pocket may have a vacuum port to enable a vacuum to be applied to the second gas pocket to prevent movement of the fourth deformable wall.

The mounting device may have a rigid partition between the working chamber and the compensation chamber, the partition being rigidly associated with the first anchor part and the auxiliary chamber being formed in the partition. The second passageway may comprise a bore in the partition and the abutment part may be aligned with the bore, whereby the third deformable wall abuts a rim of the bore when the abutment part is in the first position.

The first deformable wall may be made of a resilient material so as to expand and/or contract in response to relative movement between the first and second anchor parts. The third deformable wall may be a bellows wall. That is, it may be made of a substantially inflexible or non-resilient material. The volume of the auxiliary chamber may thus vary by movement of the third deformable wall without stretching thereof. The second deformable wall may be a bellows wall. Thus, the volume of the compensation chamber may vary by movement of the bellows wall, but without stretching thereof.

In a second aspect, the present invention provides a kit of parts for a hydraulically damped mounting device, including:

first and second anchor parts connected by a first deformable wall;

a working chamber bounded by the first deformable wall and a rigid partition rigidly associated with the first anchor part, the working chamber containing hydraulic fluid;

a compensation chamber for the hydraulic fluid, the compensation chamber being partially bounded by a second deformable wall;

a first passageway interconnecting the working and compensation chambers to allow movement of the hydraulic fluid between the working and compensation chambers;

an auxiliary chamber for hydraulic fluid, the auxiliary chamber being formed in the partition and partially bounded by a third deformable wall;

a plurality of valve plates, each valve plate having a second passageway therethrough and each being arranged to be interchangeably fixed to the partition such that the second passageway interconnects the working chamber and the auxiliary chamber;

a vacuum chamber in the partition, the vacuum chamber being connectable to a vacuum source for varying the pressure in the vacuum chamber and partially bounded by an abutment part movably mounted therein, the abutment part being movable in response to a change in pressure in the vacuum chamber between a first position in which the abutment part bears against the third deformable wall such that the third deformable wall is deformed to close the second passageway and a second position in which the abutment part allows the third deformable wall to adopt a position in which the second passageway is open; and a resilient biasing member arranged to bias the abutment part towards the first position, wherein the second passageways of each valve plate each have a bore with a rim for abutting the third deformable wall when the abutment part is in the first position and a valve orifice at a narrowest part of the bore, the rims of the valve plates each have the same configuration, the valve orifices each have different sizes, and each valve plate is fixable to the partition so that its rim is aligned with the abutment part, whereby the third deformable wall abuts the rim when the abutment part is in the first position.

In this way, the operating characteristics, i.e. frequency characteristics, of the mounting device can be tuned by selecting a valve plate having a valve orifice of an appropriate size. Advantageously, the only component which needs to be changed is the valve plate, since the interface with the third deformable wall, i.e. the rim, is the same for each valve plate. Thus, a common sealing strategy for closure of the second passageway can be achieved at low cost whilst providing a considerable amount of tuning flexibility.

The kit of parts according to the second aspect may include a rolling diaphragm connecting the abutment part to a wall of the vacuum chamber, the rolling diaphragm permitting movement of the abutment part relative to the wall of the vacuum chamber.

BRIEF DESCRIPTION OF THE DRAWINGS

Embodiments of the present invention will now be described with reference to the accompanying drawings, in which:

FIGS. 2a and 2b shows a vertical cross-section of the mounting device of FIG. 1, FIG. 2b being an enlarged view of the circled part of FIG. 2a;

FIGS. 4a and 4b are similar to FIGS. 2 and 2b but viewed along a different section of line;

FIG. 5 is a view similar to FIGS. 2a and 4a but viewed along yet another sectional line;

FIGS. 8 (a) and 8(c) show cross-sectional views and FIG. 8b shows a plan view of the mounting device of FIG. 1 in a third operating condition, FIGS. 8(a) and 8(c) being partial cross-sections taken at line A-A shown in the plan view of FIG. 8(b) and FIG. 8(c) being a cross section taken at line C-C shown in FIG. 8(b)

DETAILED DESCRIPTION

Figure 1:
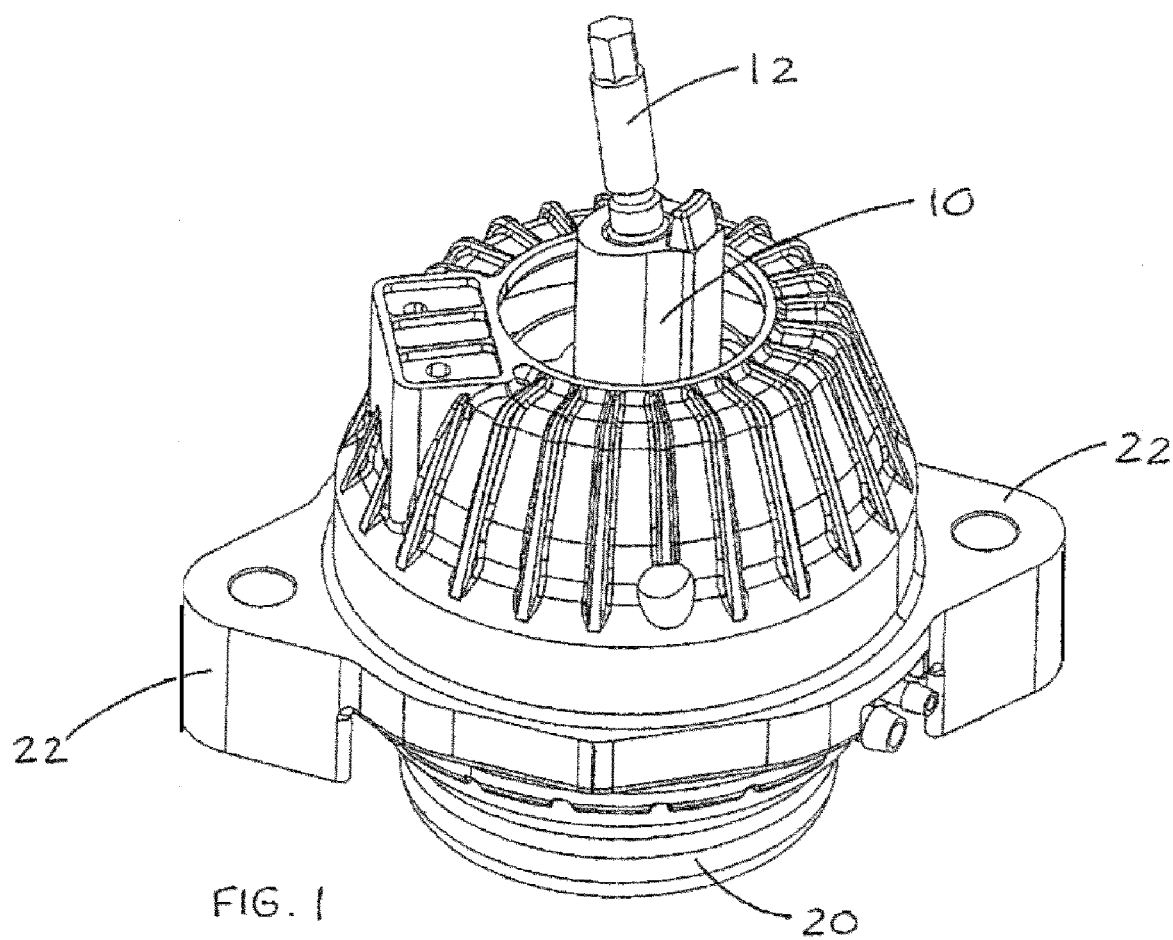
FIG. 1 shows an isometric view of a mounting device according to an embodiment of the present invention.

FIG. 1 shows a hydraulically damped mounting device for damping vibration between two parts of a structure (not shown). For example, the mounting device may be used to damp vibration between a vehicle engine and a chassis of the vehicle. The mounting device is a "cup and boss" type of mounting device, and has a boss 10 connectable via an attachment feature 12 to one of the parts of the structure, and a generally U-shaped cup 20 connectable to the other of the parts of the structure via lugs 22 projecting outwardly from opposed sides of the cup 20.

As can be seen from FIG. 2, a resilient member 30, made of rubber, interconnects the boss 10 and cup 20. The resilient member 30 is rigidly fixed to the base of the boss 10 around which it extends, and flares radially outwardly from the base of the boss 10 towards the periphery of the mounting device. The thickness of the resilient member 30 tapers with distance from the boss 10, and the resilient member 30 is rigidly connected at its narrow end to the cup 20. The connection between resilient member 30 and cup 20 is via connection of the resilient member 30 to a rigid partition 40 which extends across the open face of the cup 20 and is fixed around its periphery to the rim of the cup 20. In this way, relative movement between the boss 10 and the cup 20 is limited by the resilient member 30. For protection the resilient member may be covered by a cover 32 mounted on the cup 20 and having an aperture 34 through which the boss 10 extends.

The resilient member 30 and the partition 40 together define a working chamber 50 containing hydraulic fluid (not shown). The working chamber 50 is connected via a first passageway 60 to a compensation chamber 70. The compensation chamber 70 is bounded by the partition 40 and a compensation flexible wall 24, or bellows, which is fixed to the rim of the cup 20 and sits within it, movement of the flexible wall 24 enabling the volume of the compensation chamber 70 to vary.

The first passageway 60 passes through the partition 40 to permit flow of hydraulic fluid between the working chamber 50 and the compensation chamber 70. The first passageway 60 has a convoluted shape and movement of fluid between the working chamber 50 and the compensation chamber 70 generates inertial damping of vibrations, due to cyclical relative movement between the boss 10 and the cup 20.

The partition 40 supports an annular diaphragm 52 which separates hydraulic fluid in the working chamber 50 from air in a gas pocket (which forms the "second gas pocket" referred to earlier), bounded by the annular diaphragm 52 and the partition 40. The diaphragm 52 is held in place by a cover 53 (see FIG. 2b). The second gas pocket is connectable to an external vacuum source (not shown) by a vacuum port 56. The vacuum port 56 is in fluid communication with the second gas pocket via a second vacuum channel 58 (shown in FIG. 2b).

The partition 40 includes an upper plate 42 (on the working chamber side) and a base plate 44 (on the compensation chamber side) which may be moulded from plastics materials. The upper and base plates 42, 44 together enclose an auxiliary chamber 90. The upper plate 42 has a central opening bounded by flanges extending in an axial direction to form a generally cylindrical second passageway 80 which connects the working chamber 50 with the auxiliary chamber 90. The auxiliary chamber 90 is bounded by the lower surface (as shown in FIG. 2a) of the upper plate 42 of the partition 40 and by an auxiliary chamber flexible wall 92. The auxiliary chamber 90 is thus formed within the partition 40.

Figure 3A:
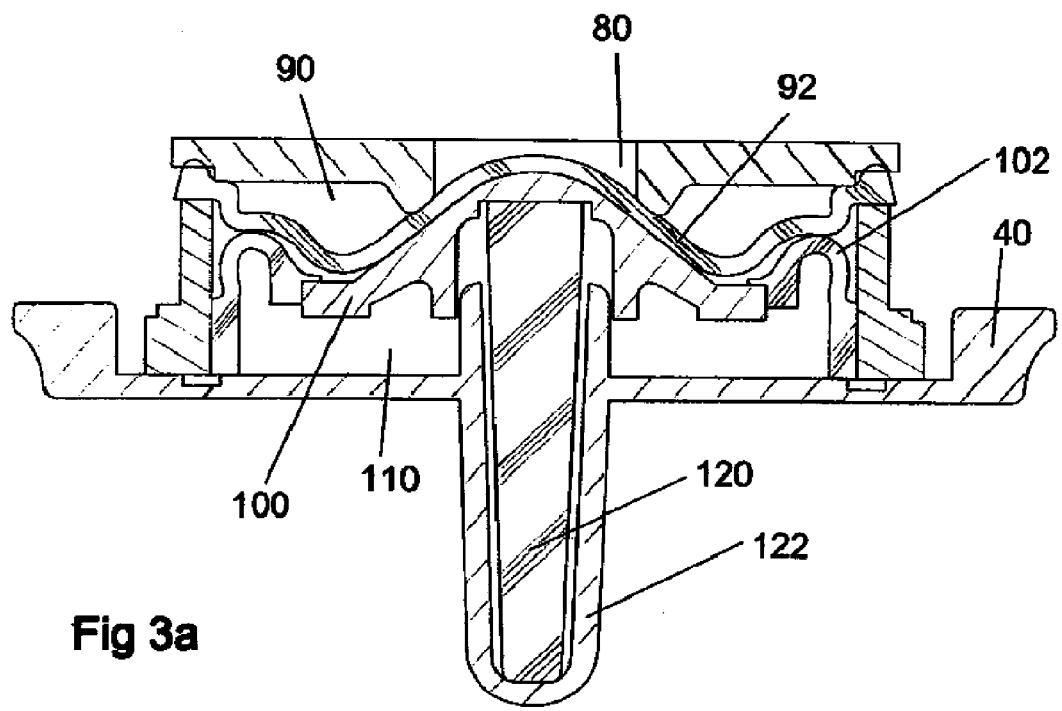
FIGS. 3(a) and (b) show cross-sectional views of a mounting device according to an embodiment of the present invention in which the second passageway is blocked and open, respectively.
Figure 3B:
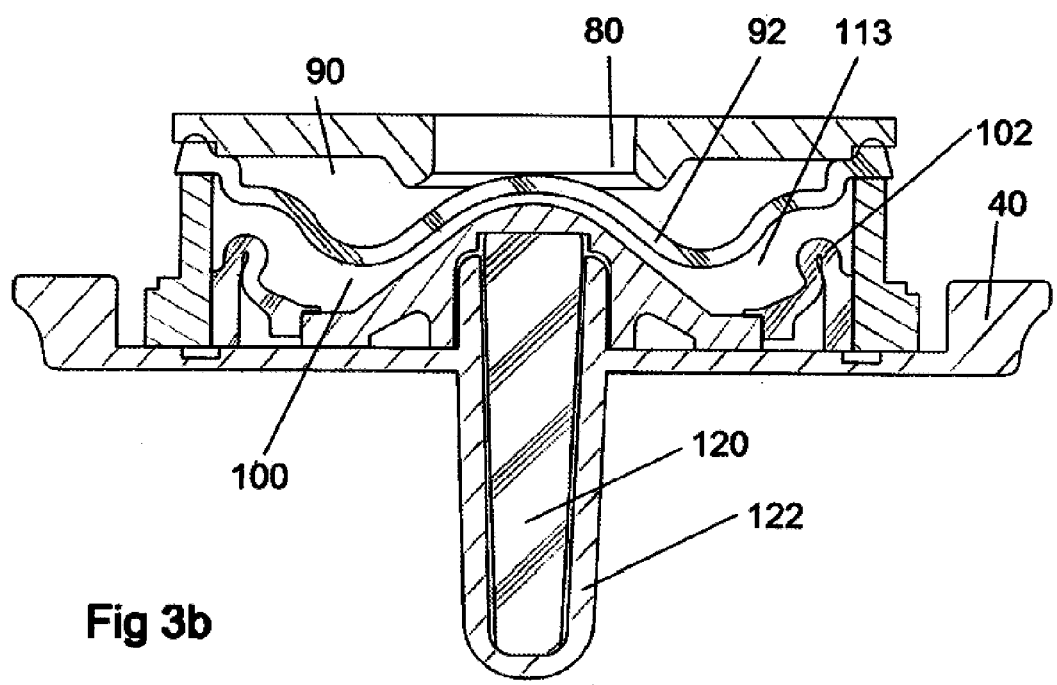

The auxiliary chamber flexible wall 92 can be flexed, or deformed, to either block the second passageway 80 to prevent movement of hydraulic fluid between the working chamber 50 and the auxiliary chamber 90 (see FIG. 3(a)), or to allow free flow of hydraulic fluid between those chambers (see FIG. 3(b)). The deformation of the auxiliary chamber flexible wall 92 is achieved by an abutment member 100 which is aligned with the second passageway 80 and movable up and down, i.e. in the direction of the axis of the second passageway 80, so that in its uppermost position (FIG. 3(a)) it forces the auxiliary chamber flexible wall 92 into a position in which it blocks the second passageway 80.

The abutment member 100 is generally dome-shaped, with a central convex portion on its upper surface which projects into the second passageway 80 in the uppermost position of the abutment member (FIG. 3(a)). This arrangement ensures a good seal between the high frequency deformable wall 92 and the peripheral edge of the second passageway 80. To the underside of the abutment member 100, i.e. the opposite side to that on which the convex portion is formed, is a central generally cylindrically-shaped recess 104.

The abutment member 100 is biased towards the uppermost position in which the second passageway 80 is blocked (FIG. 3(a)). The biasing force is provided by a resilient column spring 120, made of rubber or similar elastic material, which is retained, apart from an uppermost region in contact with the abutment member 100, within a cavity of a support housing 122. The cavity of the support housing 122 has a shape generally conforming to that of the resilient column spring 120. There is some clearance between the resilient column spring and the support housing in the uppermost position of the abutment member 100 (FIG. 3(a)) to allow for limited radial expansion of the resilient column spring 120 when it is further compressed by movement of the abutment member 100 away from its uppermost position. The support housing 122 thus provides a collar which encircles the resilient column spring 120 to aid stability and prevent buckling thereof. The support housing 122 also serves to limit and control the maximum compressive strain experienced by the resilient column spring 120 during use. The support housing 122 is fixed relative to the partition 40 via a rigid connection to the base plate 44 of the partition 40.

The resilient column spring 120 is an elongate member arranged so that one of its ends bears against the recess 104 in the underside of the abutment member 100 and the other of its ends bears against a base of the support housing 122. The length of the resilient column spring 120 is longer than the length from the base of the support housing 122 to the end of the recess 104 when the abutment member 100 is in its uppermost position, so that the resilient column spring 120 is always held under a compressive force. In this way, the resilient column spring 120 constantly applies a biasing force to the abutment member 100, urging it towards its uppermost position (FIG. 3(a)) in which the second passageway is blocked.

A vacuum chamber 110 is bounded by the abutment member 100, the base plate 44 of the partition 40, and an annular rolling diaphragm 102 which connects the abutment member 100 with the base plate 44 (i.e. with a wall of the vacuum chamber 110). The shape of the rolling diaphragm 102 is chosen to avoid inappropriate collapse under vacuums.

The vacuum chamber 110 is communicable with an external vacuum source (not shown) via vacuum port 130, which is in fluid communication with the vacuum chamber 110 via a vacuum channel 132. Thus, the pressure within the vacuum chamber 110 can be varied by the action of the external vacuum source. By reducing the pressure within the vacuum chamber 110, the abutment member 100 is moved away from its uppermost position (FIG. 3(a)) towards a lowermost position (FIG. 3(b)) against the action of the biasing force applied by the resilient column spring 120. Away from its uppermost position, the abutment member 100 does not cause the auxiliary chamber flexible wall 92 to block the second passageway 80, so that hydraulic fluid can flow freely between the working chamber 50 and the auxiliary chamber 90.

There is also a vent channel 112 which, as shown in FIG. 5, extends from the exterior of the mount to the space 113 between the flexible wall 92 and the rolling diaphragm 112.

The space 113 forms a gas pocket 104 (hereinafter "the first gas pocket" as referred to earlier) is bounded by the auxiliary chamber flexible wall 92, the abutment member 100 and the annular rolling diaphragm 102. The air within the first gas pocket 113 is vented to atmosphere via the vent channel 112 and the air passes through that channel 112 as the abutment member 100 moves between its uppermost and lowermost positions.

The annular rolling diaphragm 102 has a very low stiffness contribution, and therefore does not contribute to vibration damping. Its function is to provide a seal between the vacuum chamber 110 and the first gas pocket 104 at all possible positions of the abutment member 100. The outer edge of the rolling diaphragm 102 is fixed along its length to the base plate 44 of the partition 40 (which forms a wall of the vacuum chamber 110), and the inner edge of the rolling diaphragm 102 is fixed along its length to the peripheral edge of the abutment member 100. During movement of the abutment member 100 relative to the base plate 44 the rolling diaphragm 102 moves so that an annular U-shaped convolution, i.e. an annular bend or loop in the rolling diaphragm 102, moves away from the inner edge towards the outer edge. In this way, there is negligible stretching of the fabric of the rolling diaphragm 102. s During damping of vibrations by the mounting device, cyclical movement of the boss 10 relative to the cup 20 (see FIG. 2) causes cyclical flexing of the resilient member 30. This flexing results in cyclical increasing and decreasing of the volume of the working chamber 50. This change in volume can cause one or more of three possible effects:

hydraulic fluid can be caused to flow between the working chamber 50 and the compensation chamber 70 via the first passageway 60;

hydraulic fluid can be caused to flow between the working chamber 50 and the auxiliary chamber 90 via the second passageway 80; and the annular diaphragm 52 can move to increase or decrease the volume of the second gas pocket 54.

These three effects can be used in different combinations to create different operating conditions of the mounting device. Effect (1) is always possible in any operating condition because there is no means to prevent travel of hydraulic fluid along the first passageway 60. However, inertial resistance to fluid flow in this convoluted passageway means that fluid flow is limited at medium to high vibration frequencies. Whether effects (2) or (3) are possible depends on whether or not a vacuum is applied to the vacuum chamber 110 or second gas pocket 54, respectively. This is discussed further below.

Figure 6A:
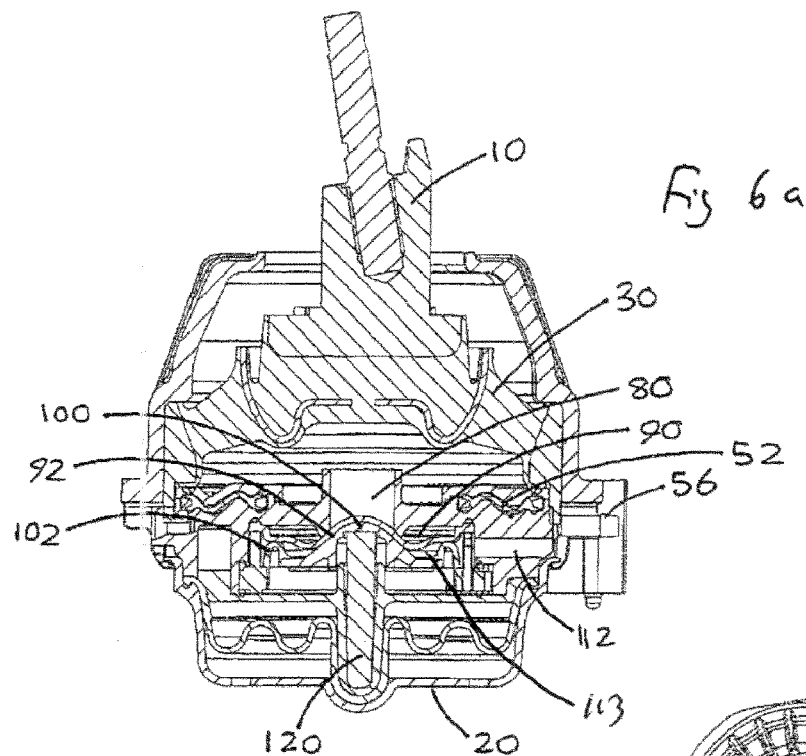
FIGS. 6(a) and 6(c) show cross-sectional views and FIG. 6b shows a plan view of the mounting device of FIG. 1 in a first operating condition, FIGS. 6(a) and 6(c) being a cross-section taken at line A-A shown in the plan view of FIG. 6(b) and FIG. 6(c) being a cross section taken at line C-C shown in FIG. 6(b)

Three advantageous operating conditions will now be described by reference to FIGS. 6, 7 and 8.

Figure 6B:
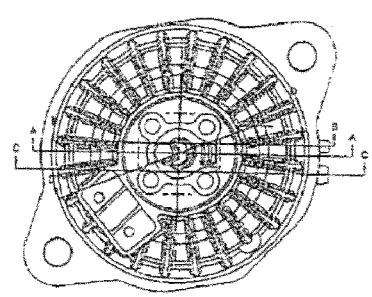

As mentioned above, FIGS. 6a and 6c are taken along the lines A-A and C-C in FIG. 6b. It may be noted that FIGS. 4a and 4b are taken on the line B-B in FIG. 6b and FIGS. 2a and 2b are taken along the line C-C in FIG. 6b.

Figure 6C:
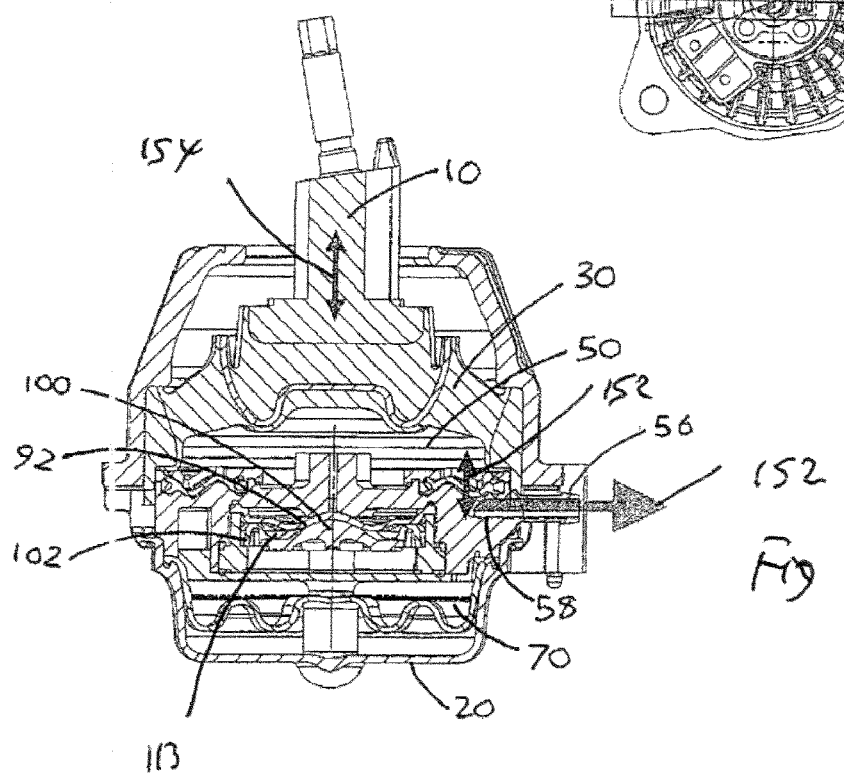

FIGS. 6(a) and 6(c) show a first operating condition suitable for damping medium to high amplitude vibrations. In this operating condition only effects (1) and (3) discussed above are possible.

Effect (2), flow through the second passageway 80, is not possible because no reduction of pressure in the vacuum chamber 110 is induced to cause the abutment member 100 to move away from the uppermost position to which it is biased by the action of the resilient column spring 120. The second passageway 80 is thus closed, and no flow of hydraulic fluid between the working chamber 50 and auxiliary chamber 90 is possible.

Effect (3), vibration of the annular diaphragm 52, is possible because the second gas pocket 54 is not subject to any variation in pressure via the vacuum port 56 and second vacuum channel 58, the vacuum port 56 being open to the atmosphere as illustrated by arrow 152. The pressure within the second gas pocket 54 is thus generally the same as the pressure external to the mounting device, i.e. atmospheric. The annular diaphragm 52 is therefore able to vibrate freely, as shown by arrow 153.

Thus, when the mounting device is subjected to medium to high vibrations (shown by arrow 154) in the first operating condition, the change in volume of the working chamber 50 caused by cyclic movement of the resilient member 30 results in movement of hydraulic fluid through the first passageway 60 and deflection of the annular diaphragm 52. Most of the volume change is accommodated by movement of the annular diaphragm 52, with only a limited amount being accommodated by motion of fluid within the first passageway 60.

Figure 7A:
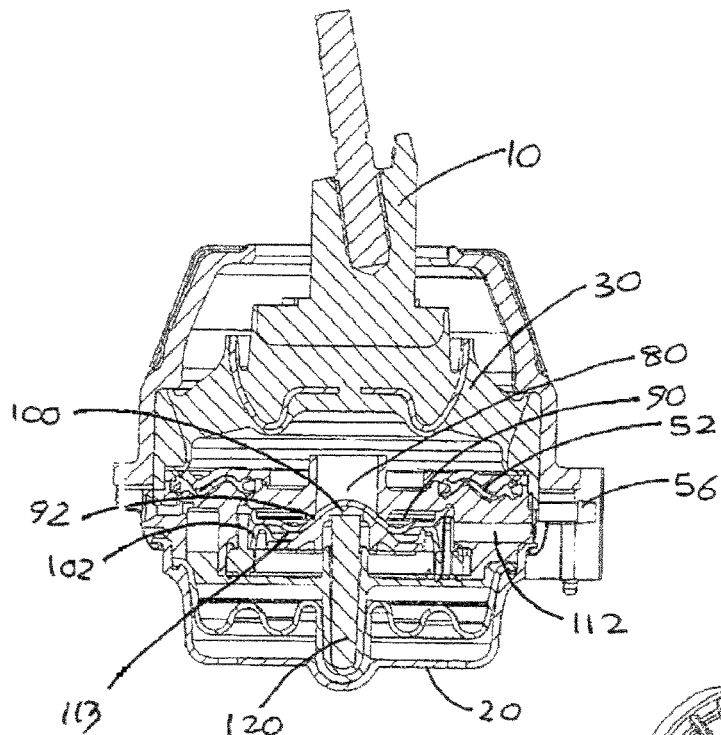
FIGS. 7 (a) and 7(c) show cross-sectional views and FIG. 7b shows a plan view of the mounting device of FIG. 1 in a second operating condition, FIGS. 7(a) and 7(c) being cross-sections taken at line A-A shown in the plan view of FIG. 7(b) and FIG. 7(c) being a cross section taken at line C-C shown in FIG. 7(b)
Figure 7B:
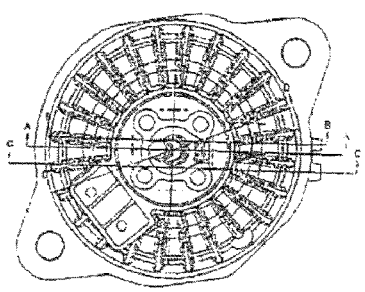
Figure 7C:
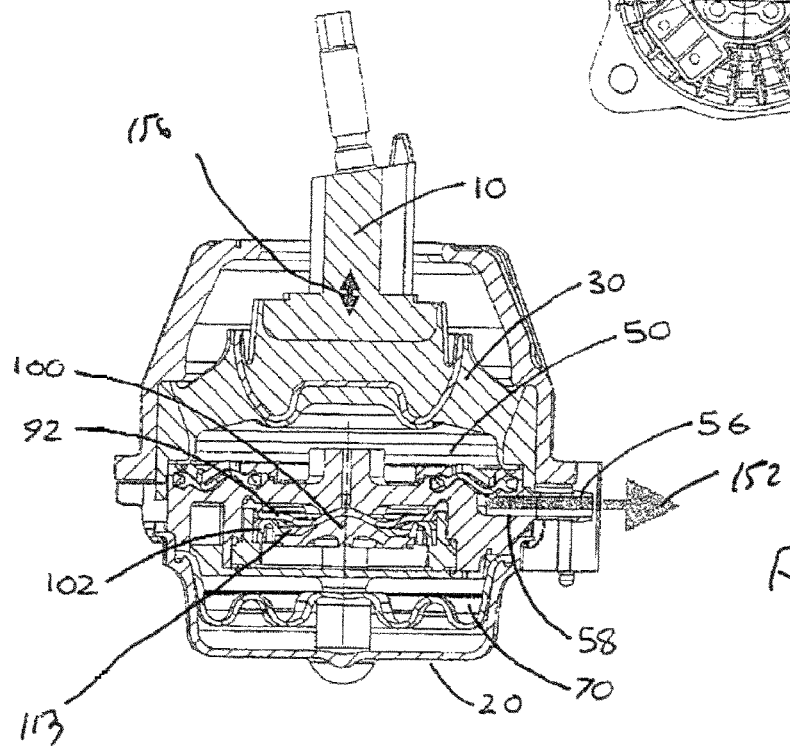

FIGS. 7(a) and 7(c) show a second operating condition suitable for damping low amplitude, low frequency vibrations. In this operating condition only effect (1) discussed above is possible.

As for the first operating condition, effect (2), flow through the second passageway 80, is not possible because the second passageway 80 is closed by the biasing action of the resilient column spring 120 acting on the abutment member 100. Thus, no flow of hydraulic fluid between the working chamber 50 and auxiliary chamber 90 is possible.

Effect (3), vibration of the annular diaphragm 52, is not possible because a vacuum is applied to the second gas pocket 54 via the vacuum port 56, and gas flow in the direction of arrow 152 does not occur so that vibration of the annular diaphragm 52 is prevented.

Thus, when the mounting device is subjected to low amplitude, low frequency vibrations (indicated by arrow 156) in the second operating condition, the change in volume of the working chamber 50 caused by cyclic movement of the resilient member 30 results only in movement of hydraulic fluid through the first passageway 60.

FIGS. 8(a) and 8(c) show a third operating condition suitable for damping low amplitude, high frequency vibrations. In this operating condition only effects (1) and (2) discussed above are possible.

Effect (2), flow through the second passageway 80, is possible because a vacuum is applied to the vacuum chamber 110 via vacuum port 130 and second vacuum channel 132 so that the abutment member 100 is moved away from its uppermost position. Thus, the second passageway 80 is unblocked, and hydraulic fluid can flow freely between the working chamber 50 and the auxiliary chamber 90.

Effect (3), vibration of the annular diaphragm 52, is not possible because a vacuum is applied to the second gas pocket 54 via vacuum port 56 and vacuum channel 58 so that vibration of the annular diaphragm 52 is prevented.

Thus, when the mounting device is subjected to low amplitude, high frequency vibrations in the third operating condition, the change in volume of the working chamber 50 caused by cyclic movement of the resilient member 30 results in movement of hydraulic fluid through the first passageway 60 and the second passageway 80. In practice, there is limited fluid movement through the first passageway 60 because of the higher flow resistance of that channel compared to the second passageway 80; most fluid flow occurs between the working chamber 50 and the auxiliary chamber 90 via the second passageway 80.

The operating properties of the mounting device may be tuned by varying certain features of the device. The length and cross-sectional area of the first passageway 60 can be varied by changing the geometry of the base plate 44 of the partition 40. The base plate 44 geometry can also be changed to control the stiffness of the resilient column spring 120 and its allowable travel.

Figure 9A:
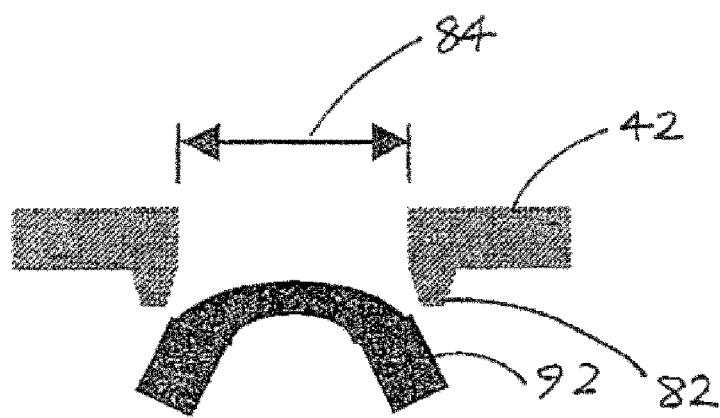
FIGS. 9(a) and (b) show schematic detail views illustrating the use of interchangeable valve plates for tuning the mounting device of the present invention.
Figure 9B:
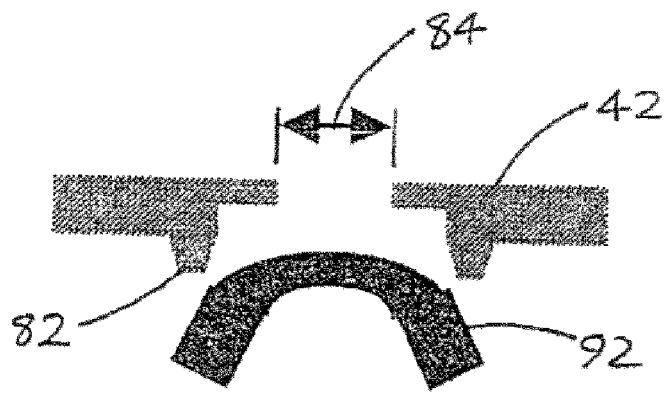

Similarly, the orifice size (i.e. valve nozzle size) of the second passageway 80 can be altered. FIGS. 9(a) and 9(b) schematically illustrate this feature of the present invention. The figures show views of a region of the upper plate 42 (also known as the valve plate) of the partition 40 surrounding the second passageway, each upper plate 42 having a different geometry for the second passageway. Both upper plates 42 have identical sealing lips 82 which project away from the upper plate 42 to form a seal with the auxiliary chamber flexible wall 92 when the abutment member 100 is in its uppermost position (FIG. 3(a)). However, the valve orifice diameter 84 of the second passageway, i.e. the diameter of the channel at its narrowest part, is different in each upper plate 42. Thus, by interchanging the upper plates 42 of FIGS. 9(a) and 9(b) with one another, the operating characteristics of the mounting device can easily be controlled.

Moreover, there is no need to provide separate tooling moulds for forming the two upper plates 42 shown in FIGS. 9(a) and 9(b). The upper plate 42 in FIG. 9(a), which has a larger valve orifice diameter 84 than that of FIG. 7(b), can be made using the same tooling mould used for the upper plate 42 of FIG. 9(b) but with the addition of a tooling insert to increase the valve orifice diameter 84.

In this way, a common sealing strategy for closure of the second passageway can be achieved at low cost whilst providing a considerable amount of tuning flexibility.

What is claimed is:

1. A hydraulically damped mounting device comprising:
   first and second anchor parts connected by a first deformable wall;
   a working chamber partially bounded by the first deformable wall, the working chamber containing hydraulic fluid;
   a compensation chamber for the hydraulic fluid, the compensation chamber being partially bounded by a second deformable wall;
   a first passageway interconnecting the working and compensation chambers to allow movement of the hydraulic fluid between the working and compensation chambers;
   an auxiliary chamber for hydraulic fluid, the auxiliary chamber being partially bounded by a third deformable wall;
   a second passageway interconnecting the working chamber and the auxiliary chamber;
   a vacuum chamber connectable to a vacuum source for varying the pressure in the vacuum chamber, the vacuum chamber being partially bounded by an abutment part movably mounted therein, the abutment part being movable in response to a change in pressure in the vacuum chamber between a first position in which the abutment part bears against the third deformable wall such that the third deformable wall is deformed to close the second passageway and a second position in which the abutment part allows the third deformable wall to adopt a position in which the second passageway is open; and
   a resilient biasing member arranged to bias the abutment part towards the first position,
   wherein the abutment part is connected to a wall of the vacuum chamber by a rolling diaphragm to permit movement of the abutment part relative to the wall of the vacuum chamber.

2. A hydraulically damped mounting device according to claim 1, wherein the resilient biasing member is a columnar block of resilient material, one end of which is fixed relative to the first anchor part and the other end of which is in contact with the abutment part, whereby the resilient biasing member is held under a compressive force.

3. A hydraulically damped mounting device according to claim 2, wherein the resilient biasing member is held within a collar arranged to restrict radial movement of the columnar block of resilient material.

4. A hydraulically damped mounting device according to claim 2, wherein the resilient material is rubber.

5. A hydraulically damped mounting device according to claim 1, wherein the rolling diaphragm has an annular shape with an inner circumference and an outer circumference, the inner circumference being fixed to the abutment part and the outer circumference being fixed to said wall of the vacuum chamber.

6. A hydraulically damped mounting device according to claim 1, having a first gas pocket at least partially bounded by the third deformable wall, the abutment part and the rolling diaphragm.

7. A hydraulically damped mounting device according to claim 1, wherein the abutment part has a dome-shaped portion arranged to protrude into the second passageway in the first position.

8. A hydraulically damped mounting device according to claim 1, having a second gas pocket at least partially bounded by a fourth deformable wall separating the second gas pocket from the working chamber.

9. A hydraulically damped mounting device according to claim 7, wherein the fourth deformable wall has an annular shape.

10. A hydraulically damped mounting device according to claim 1, having a rigid partition between the working chamber and the compensation chamber, the partition being rigidly associated with the first anchor part and the auxiliary chamber being formed in the partition.

11. A hydraulically damped mounting device according to claim 10, wherein said second passageway comprises a bore in the partition and the abutment part is aligned with the bore, whereby the third deformable wall abuts a rim of the bore when the abutment part is in the first position.

12. A kit of parts for a hydraulically damped mounting device, including:
   first and second anchor parts connected by a first deformable wall;
   a working chamber bounded by the first deformable wall and a rigid partition rigidly associated with the first anchor part, the working chamber containing hydraulic fluid;
   a compensation chamber for the hydraulic fluid, the compensation chamber being partially bounded by a second deformable wall;
   a first passageway interconnecting the working and compensation chambers to allow movement of the hydraulic fluid between the working and compensation chambers;
   an auxiliary chamber for hydraulic fluid, the auxiliary chamber being formed in the partition and partially bounded by a third deformable wall;
   a plurality of valve plates, each valve plate having a second passageway therethrough and each being arranged to be interchangeably fixed to the partition such that the second passageway interconnects the working chamber and the auxiliary chamber;
   a vacuum chamber in the partition, the vacuum chamber being connectable to a vacuum source for varying the pressure in the vacuum chamber and partially bounded by an abutment part movably mounted therein, the abutment part being movable in response to a change in pressure in the vacuum chamber between a first position in which the abutment part bears against the third deformable wall such that the third deformable wall is deformed to close the second passageway and a second position in which the abutment part allows the third deformable wall to adopt a position in which the second passageway is open; and a resilient biasing member arranged to bias the abutment part towards the first position, wherein the second passageways of each valve plate each have a bore with a rim for abutting the third deformable wall when the abutment part is in the first position and a valve orifice at a narrowest part of the bore, the rims of the valve plates each have the same configuration, the valve orifices each have different sizes, and each valve plate is fixable to the partition so that its rim is aligned with the abutment part, whereby the third deformable wall abuts the rim when the abutment part is in the first position.

13. A kit of parts according to claim 12, including a rolling diaphragm connecting the abutment part to a wall of the vacuum chamber, the rolling diaphragm permitting movement of the abutment part relative to the wall of the vacuum chamber.

* * * * *